United States Patent
Patino et al.

(10) Patent No.: US 10,525,825 B2
(45) Date of Patent: Jan. 7, 2020

(54) VEHICLE HAVING A VEHICLE TANK AND REINFORCEMENT FOR A VEHICLE TANK

(71) Applicant: Deere & Company, Moline, IL (US)

(72) Inventors: Mario Patino, Ludwigshafen (DE); Oliver Rabut, Trippstadt (DE); Patrik Mueller, Maikammer (DE)

(73) Assignee: DEERE & COMPANY, Moline, IL (US)

( * ) Notice: Subject to any disclaimer, the term of this patent is extended or adjusted under 35 U.S.C. 154(b) by 3 days.

(21) Appl. No.: 15/632,364

(22) Filed: Jun. 25, 2017

(65) Prior Publication Data

US 2018/0015822 A1 Jan. 18, 2018

(30) Foreign Application Priority Data

Jul. 18, 2016 (DE) .................. 10 2016 213 103

(51) Int. Cl.
*B60K 15/07* (2006.01)
*B60K 15/03* (2006.01)

(52) U.S. Cl.
CPC ........ *B60K 15/07* (2013.01); *B60K 15/03006* (2013.01); *B60K 15/03177* (2013.01); *B60K 2015/03046* (2013.01); *B60K 2015/03421* (2013.01); *B60K 2015/03493* (2013.01)

(58) Field of Classification Search
CPC ...... B60K 15/07; B60K 15/067; B60K 15/03; B60K 15/03006; B60K 15/03177
See application file for complete search history.

(56) References Cited

U.S. PATENT DOCUMENTS

| | | | | |
|---|---|---|---|---|
| 2,407,455 A | * | 9/1946 | Shakesby | B64D 37/02 220/653 |
| 2,672,902 A | * | 3/1954 | Prager | B65D 88/1637 280/1 |
| 3,401,816 A | * | 9/1968 | Witt | B60P 7/13 220/476 |
| 4,724,293 A | * | 2/1988 | Bertels | B23K 11/002 219/117.1 |
| 5,178,433 A | * | 1/1993 | Wagner | B60G 99/004 296/35.1 |
| 6,138,859 A | * | 10/2000 | Aulph | B60K 15/03 137/574 |

(Continued)

FOREIGN PATENT DOCUMENTS

| | | |
|---|---|---|
| DE | 674426 C | 4/1939 |
| DE | 1988823 U | 7/1968 |

(Continued)

OTHER PUBLICATIONS

European Search Report issued in counterpart application No. 17181220.9 dated Nov. 16, 2017. (10 pages).

(Continued)

*Primary Examiner* — Joseph M Rocca
*Assistant Examiner* — Michael R Stabley (57) ABSTRACT

A reinforcement for a tank wall of a vehicle tank includes at least one reinforcing shield for flanking the tank wall, a shield support for supporting the reinforcing shield, and a clamping element. The shield support is axially secured in an axial direction on a clamping element. At least a portion of the reinforcing shield extends in a flank direction transverse to the axial direction.

15 Claims, 8 Drawing Sheets

(56) References Cited

U.S. PATENT DOCUMENTS

| | | | | |
|---|---|---|---|---|
| 6,338,420 | B1 * | 1/2002 | Pachciarz | B60K 15/03177 |
| | | | | 220/4.13 |
| 6,543,828 | B1 * | 4/2003 | Gass | B21D 35/00 |
| | | | | 296/35.1 |
| 6,910,671 | B1 * | 6/2005 | Norkus | B62D 24/02 |
| | | | | 248/560 |
| 7,427,000 | B2 * | 9/2008 | Austerhoff | B60K 15/03006 |
| | | | | 220/4.14 |
| 2006/0171794 | A1 | 8/2006 | Ordonio, Jr. et al. | |
| 2012/0024868 | A1 * | 2/2012 | Menke | B60K 15/03 |
| | | | | 220/653 |
| 2012/0138606 | A1 * | 6/2012 | Varga | B60K 15/03177 |
| | | | | 220/4.21 |
| 2012/0325822 | A1 * | 12/2012 | Pozgainer | B60K 15/03177 |
| | | | | 220/562 |

FOREIGN PATENT DOCUMENTS

| | | | | |
|---|---|---|---|---|
| DE | 102012009157 A1 * | 11/2013 | | B60K 15/03 |
| DE | 102013011342 A1 * | 1/2015 | | B60K 15/03 |
| EP | 2537696 A1 | 12/2012 | | |

OTHER PUBLICATIONS

European Search Report issued in counterpart application No. 17181220.9 dated May 7, 2019. (7 pages).

Machine translation of the European Search Report issued in counterpart application No. 17181220.9 dated May 7, 2019 (4 pages).

* cited by examiner

VEHICLE HAVING A VEHICLE TANK AND REINFORCEMENT FOR A VEHICLE TANK

RELATED APPLICATIONS

This application claims the benefit of German Application Ser. No. 102016213103.6, filed on Jul. 18, 2016, the disclosure of which is hereby expressly incorporated by reference in its entirety.

FIELD OF THE DISCLOSURE

The present disclosure relates to a reinforcement for a tank wall of a vehicle tank, and in particular, to a vehicle having a vehicle tank and a reinforcement for a tank wall of the vehicle tank.

BACKGROUND

It is known that the fuel tanks of agricultural vehicles can be subjected to relatively large forces due to hydrostatic pressure or temperature influences on the tank walls, depending on certain internal pressure conditions. To avoid deformations of the tank walls, which are often made of plastic, by these forces it is possible, for example, to dimension the thickness of the tank walls larger, or the structural design of the tank walls can have wall ribs as reinforcement, which additionally stiffen the tank walls.

SUMMARY

In one embodiment of the present disclosure, a device for reinforcing a tank wall of a vehicle tank is provided which has at least one reinforcing shield for flanking the tank wall and a shield support for supporting the reinforcing shield. The shield support is secured axially fixedly on a clamping element of a clamping device so that the reinforcing shield is also secured by its mounting on the shield support against undesired movements along the axial direction. The reinforcing shield also extends at least in part in a flank direction that runs transversely to the axial direction. In this way, the reinforcing shield flanks a tank wall along the flank direction and acts as reinforcement against any undesired distortions or deformations of this flanked tank wall.

In particular, the flank direction runs at a right angle to the axial direction of the reinforcing device, i.e. in a radial direction of the reinforcing device.

Depending on the design of the device, the reinforcing shield can either flank the tank wall at a distance or can directly contact the respective tank wall. The selection of one of these two designs depends above all on whether a certain deformation or bulging of the tank wall is to be permitted or not. The shield support and the reinforcing shield are advantageously dimensioned such that the tank wall directly bears against the reinforcing shield after reaching a first deformation, so that further deformation is prevented.

The reinforcing shield can be mounted on the shield support by an integral connection between components, for example. Alternatively, the reinforcing shield and the shield support are separate components. They can be fixedly connected to one another. In another embodiment, the shield support, which is axially secured in an installation position of the device, can be used to automatically fix the reinforcing shield relative to a tank wall, e.g. to clamp it between the shield support and the tank wall.

By using the reinforcing device, the portions of the tank walls that have a tendency to deform or bulge under defined physical boundary conditions can be specifically reinforced. This avoids a thicker dimensioning of all the tank walls of the vehicle tank. More cost-intensive design configurations of the tank walls with integrated reinforcing ribs or other design measures on the tank walls are also superfluous.

The reinforcing device provides a separate device which is simple in terms of production technology in order to avoid deformations or bulging or at least limit them to such an extent that certain minimum distances from other components, particularly rotating components (e.g. tires of vehicle wheels), of the vehicle are maintained. In this way, corresponding safety measures can be dispensed with in designing the vehicle tank.

In one embodiment, the axial securing of the shield support and thus also of the reinforcing shield is designed to be releasable. This can be accomplished by an appropriate design of the clamping device (e.g., a screw mechanism). The releasable axial securing supports a flexible use of the reinforcing device. In the event of irreversible damage or defectiveness of the vehicle tank, the reinforcing device can be reused to save costs. Furthermore, after releasing the axial securing, individual components of the reinforcing device can be replaced if necessary while the other components can continue to be used.

The reinforcing shield is arranged axially displaced, at least in certain sections, relative to a plane of the shield support. Thereby the reinforcing device can adapt well to different geometrical cross-sections of tank walls.

In particular, the reinforcing shield has a transition section for fixed (e.g., integral) connection to the shield support. If the reinforcing shield and the shield support are in axially offset planes, such a transitional section can be used there, in addition to its connecting function between the reinforcing shield and the shield support, to achieve a reinforcing effect on wall portions of the vehicle tank that run transversely to the flank direction.

The reinforcing shield may be arranged substantially in one plane (or multiple planes) that runs or run parallel to the flank direction. The reinforcing shield can also have different shapes, e.g., a rotationally symmetrical disk. In another embodiment, the reinforcing shield has one or more brace-like reinforcing sections running in a circumferential direction transverse to the axial direction and transverse to the flank direction. Thus a relatively large wall surface of the vehicle tank can be effectively reinforced with little use of materials for the reinforcing shield.

If there are multiple reinforcing sections or reinforcing braces, at least two reinforcing braces are advantageously arranged offset in the axial direction. Thereby the reinforcing device can be flexibly adapted to complex cross-sectional profiles of a tank wall and also to geometrically different types of vehicle tanks.

Depending on the tank wall in question, a reinforcing brace or multiple reinforcing braces are used, which supports the modular character of the reinforcing device and thus the flexible use thereof.

Reinforcing braces of a reinforcing shield can be identical or can be designed to be different if necessary, in order to achieve an adaptation of the reinforcing shield to different surface and cross-sectional profiles of a tank to be reinforced.

In a further embodiment, the shield support is penetrated in the axial direction by a support opening, in order to assist in easy installation of the shielding device. For example, the clamping element (e.g., a clamping bolt) passes through the support opening axially in the installation position, in order to achieve an installation-friendly clamping of the shield support and thus also the reinforcing shield.

To support the reinforcing effect, the rigidity or hardness of the material for the reinforcing shield is greater than the corresponding material property of the tank wall to be reinforced. In other words, the material properties of the reinforcing shield are sufficiently different in comparison to [those of] the tank wall that, under identical physical conditions, the reinforcing shield has no distortions or deformations or at least less distortion or deformation. For example, a steel plate is used for the reinforcing shield, whereas the tank wall consists of a plastic.

The reinforcing shield or the shield support may consist of a metal plate, particularly a steel plate. With appropriately dimensioned plate thickness, the reinforcing shield can form a sufficiently rigid barrier against deformations of the flanked tank wall without additional measures. The reinforcing shield and/or the shield support can be produced by simple production technology as a deep-drawn sheet metal part. Thereby the reinforcing device can be adapted cost-effectively to the respective geometric-design configuration of the tank walls to be reinforced.

As already described above, the reinforcement is used for a vehicle tank or fuel container for vehicles, particularly agricultural vehicles.

The vehicle tank has an axial passage opening delimited by its outer wall, which can receive the clamping device at least in part and thereby can be used as an installation aid for the reinforcing device. If this passage opening for the clamping device is not required for specific application cases, it can nevertheless be used in a different function as an installation aid for secure fastening of the vehicle tank to a support structure of the vehicle, e.g., a chassis.

In another embodiment, the clamping element (e.g., a clamping bolt) of the clamping device passes through the passage opening of the vehicle tank and is also fixed to (e.g., bolted onto) a support structure of the vehicle. In this manner, fastening of the reinforcing device to the support structure and simultaneously the desired stable reinforcing of the vehicle tank can be achieved by simple mechanical means.

Alternatively, stable fastening of the reinforcing device exclusively to the tank is also possible, if no suitable fastening position is available on the support structure of the vehicle. For this purpose, it is provided that the clamping element passes through the passage opening of the vehicle tank and is fixed in the area of an axially opposing outer wall of the vehicle tank.

The clamping element can be fixed to the vehicle tank in various ways. For example, the clamping element may cooperate with suitable fixing means on the side of the passage opening of the vehicle tank facing axially away from the reinforcing shield in order to achieve a stable fixation of the clamping element and thus a stable support of the reinforcing shield in the installation position of the reinforcing device. These fixing means are designed, for example, as a threaded insert with internal thread that cooperates with an external thread of the clamping element. Alternatively, fixing means can be provided which are loose outside of the installation position of the clamping device and only assume a fixed position relative to the vehicle tank in the installation position. These fixing means can be designed as threaded nuts, washers and also as an additional reinforcing shield.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
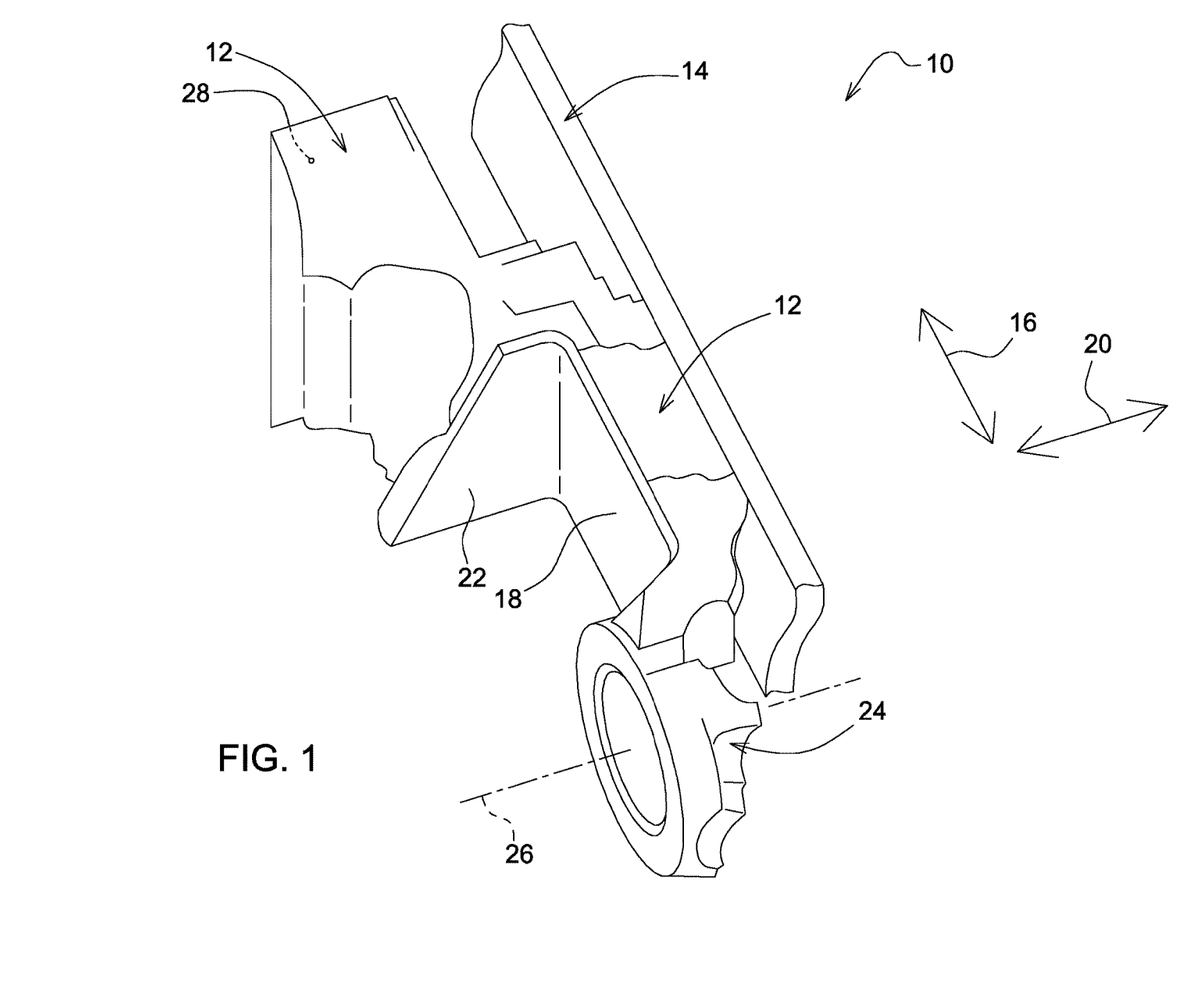
FIG. 1 is a perspective view of a vehicle tank mounted on a vehicle.

In FIG. 1, a cutaway view of an agricultural vehicle 10 (e.g. a tractor), namely the vehicle tank 12 thereof, is shown which flanks a plate-like portion of a support structure 14 (e.g., a chassis) of the vehicle 10 or is directly mounted on this portion. The vehicle tank 12 is used for storing fuel for propelling the vehicle 10. The exterior tank walls of the vehicle tank 12 are to be protected from bulging or deformations in such a manner that other components of the vehicle 10 do not come into contact with the tank walls of the vehicle tank. For example, a tank wall 18 extending in the longitudinal, or travel, direction 16 of the vehicle 10 and a tank wall 22 extending in the transverse direction 20 of the vehicle 10 are to be protected from contact with a rotating tire (not shown here, however) on the rear axle 24 of the vehicle 10. The tire rotates about an axis of rotation 26 of the rear axle 24. A tank wall 28 opposite from the tank wall 22 in the longitudinal direction 16 also has a sufficient distance from other components of the vehicle 10.

Figure 2:
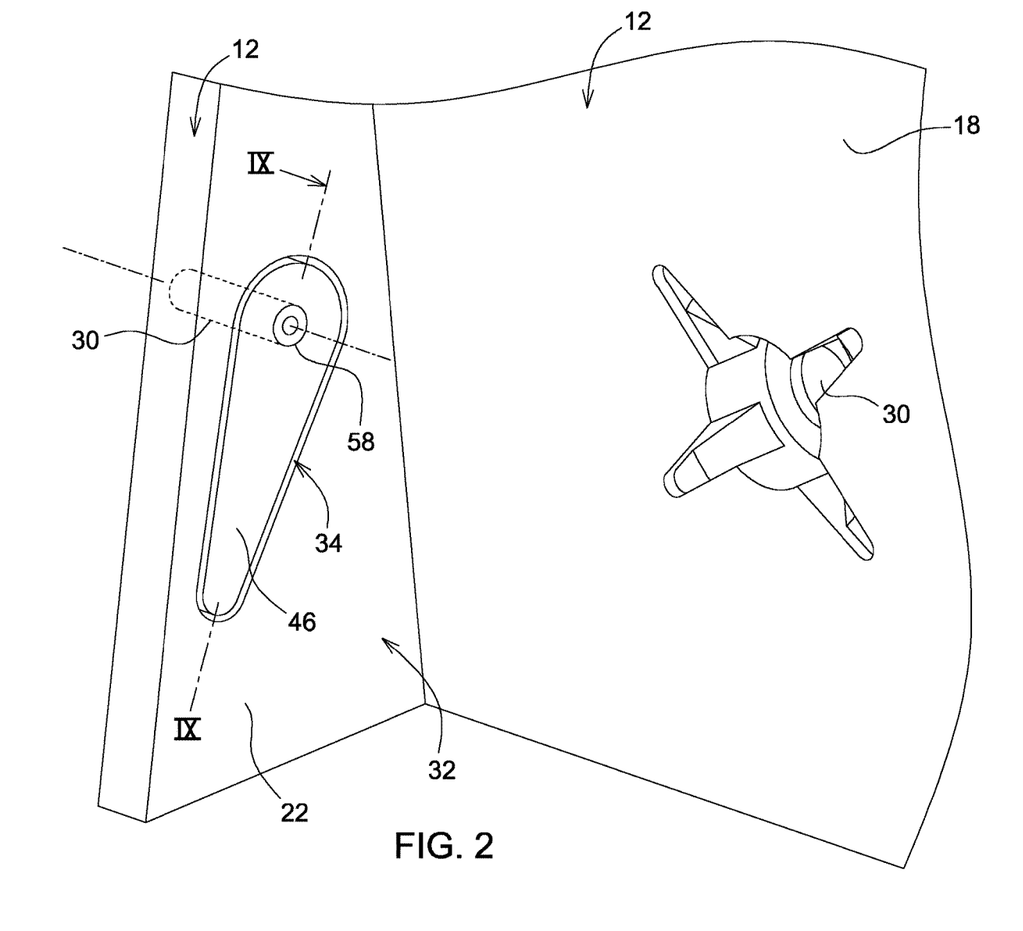
FIG. 2 is a perspective view of the vehicle tank according to FIG. 1, with illustrated passage openings.

According to FIG. 2, the vehicle tank 12 is penetrated in the region of the tank wall 18 by a passage opening 30, which cooperates in a matter yet to be described with a reinforcing device 32. Basically, the reinforcing devices 32 described here flank the tank wall of the vehicle tank 12 to be reinforced in order to protect the reinforced tank wall against bulging or deformations or to limit the bulging or deformations to a permissible maximum level. The material of the reinforcement (e.g., steel plate) has a greater rigidity than the material of the tank wall to be reinforced (e.g., plastic).

Figure 3:
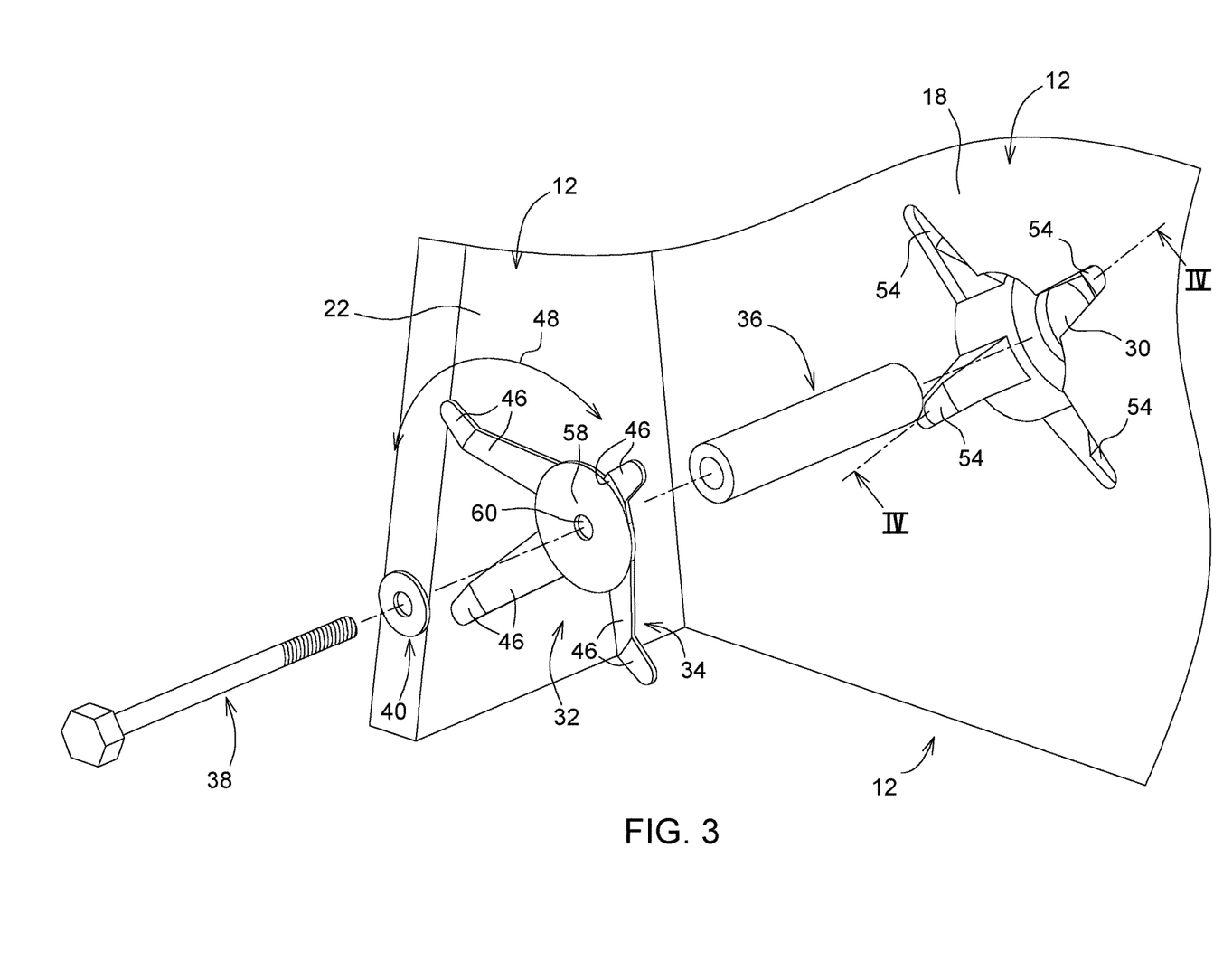
FIG. 3 is a perspective view of the vehicle tank according to FIG. 2 and a reinforcement in an exploded view.
Figure 4:
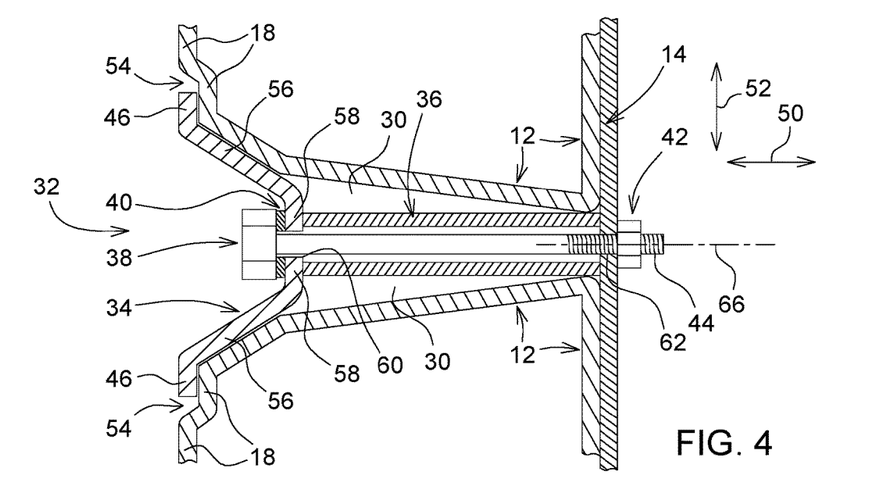
FIG. 4 is a sectional side view, corresponding to section line IV-IV in FIG. 3, of the reinforcement according to FIG. 3 in the installed position.

FIG. 3 shows a first embodiment of the reinforcement device 32. It contains multiple components resembling a kit, namely, at least a reinforcing shield 34, a spacer sleeve 36, a clamping element in the form of a clamping bolt 38, a washer 40 and a threaded nut 42, which cooperates in the installed position of the reinforcing device 32 with an external thread 44 of the clamping bolt 38 (FIG. 4). The reinforcing shield 34 according to FIG. 3 has a total of four reinforcing braces 46, which are arranged uniformly in a circumferential direction 48 of the reinforcing shield 34. The circumferential direction 48 runs at a right angle to an axial direction 50 and a flank direction 52 of the reinforcing device 32 (FIG. 4). The flank direction 52 runs at a right angle to the axial direction 50 and can therefore also be referred to as a radial direction.

In the installation position of the reinforcing device 32 according to FIG. 4, at least the radial free ends of the reinforcing braces 46 are situated in channel-like wall recesses 54 of the tank wall 18 and flank individual portions of the tank wall 18 along the flank direction 52. The reinforcing braces 46 bear directly against the tank wall 18 here and effect a reinforcement in the axial direction 50, i.e., the reinforcing braces 34 prevent bulging of the tank wall 18 in the axial direction 50.

In addition, a transition section 56, running in the flank direction 52, of the individual reinforcing braces 46 flanks an additional portion of the tank wall 18, so that the reinforcing braces 46 also effect a reinforcement of the vehicle tank 12 in the flank direction 52 or the radial direction. The transition section 56 connects the respective reinforcing brace 46 to a common shield support 58, which, as a component of the reinforcing shield 34, is used for supporting the latter in the installation position. The shield support 58 is penetrated in the axial direction 50 by a support opening 60 in order to receive the clamping bolt 38 in the installation position. The reinforcing braces 46 are integrally connected to the common shield support 58. In the installed position according to FIG. 4, the shield support 58 is fixed in the axial direction 50 by means of the clamping bolt 38 in an axially secured manner, namely clamped between the bolt head of the clamping bolt 38 and the spacer sleeve 36. The external thread 44 of the clamping bolt 38 passes through an installation opening 62 of the support structure 14 and cooperates in the conventional manner with the nut 42. The axially secured fixation of the shield support 58 simultaneously effects an axially secured mounting of the reinforcing braces 46 and thus the reinforcing shield 34.

Figure 5:
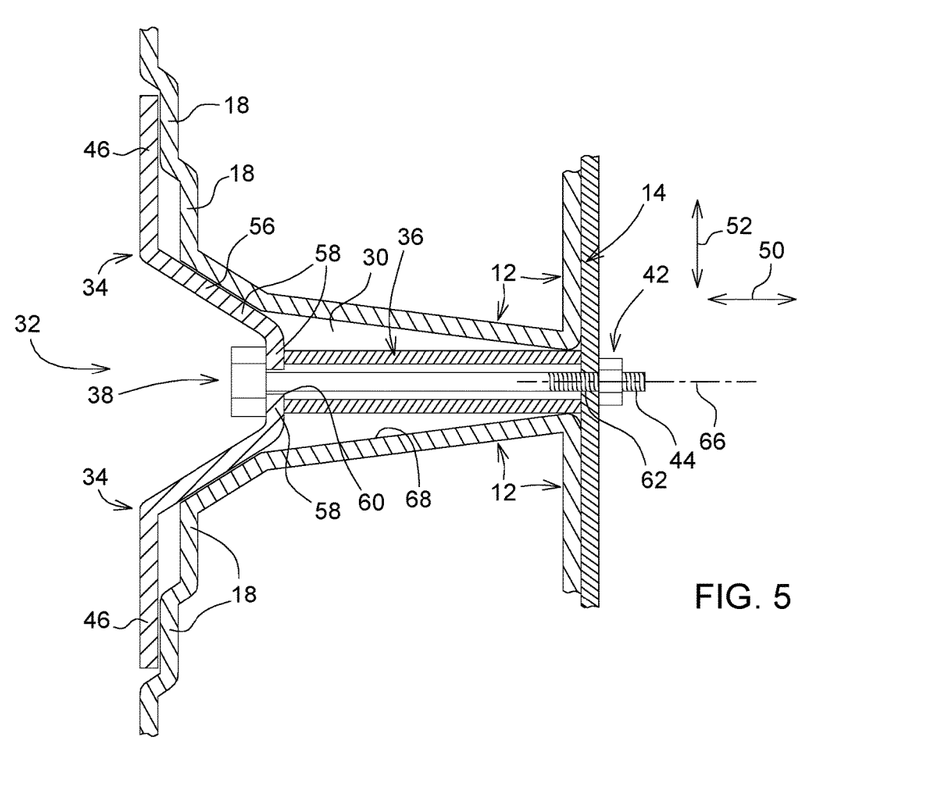
FIG. 5 is a sectional side view of the reinforcement in an installed position in an additional embodiment.

The reinforcing device 32 according to FIG. 5 differs from the embodiment in FIG. 4 essentially in that the reinforcing shield 34 bears directly against the tank wall 18 in the installation position only at a radially outer portion of the reinforcing braces 46, while radially inner portions of the reinforcing braces 46 flank the tank wall 18 at an axial distance. The shield support 58 is again integrally connected to the reinforcing braces 46.

In general, the reinforcing shield 34 can have a different number of reinforcing braces 46, depending on the application case. The reinforcing braces 46 can have different geometrical cross-sectional shapes, even within a single reinforcing shield 34. In other embodiments, the reinforcing braces 46 of a reinforcing shield 34 can be replaced by an annular disk-like reinforcement 64 (FIG. 6), which is either integral with the shield support 58 or is provided as a separate component. In the latter case, the shield support 58 bears the transition section 56. The shield support 58 is rotationally symmetric relative to a central longitudinal axis 66 of the reinforcing device 32.

Figure 6:
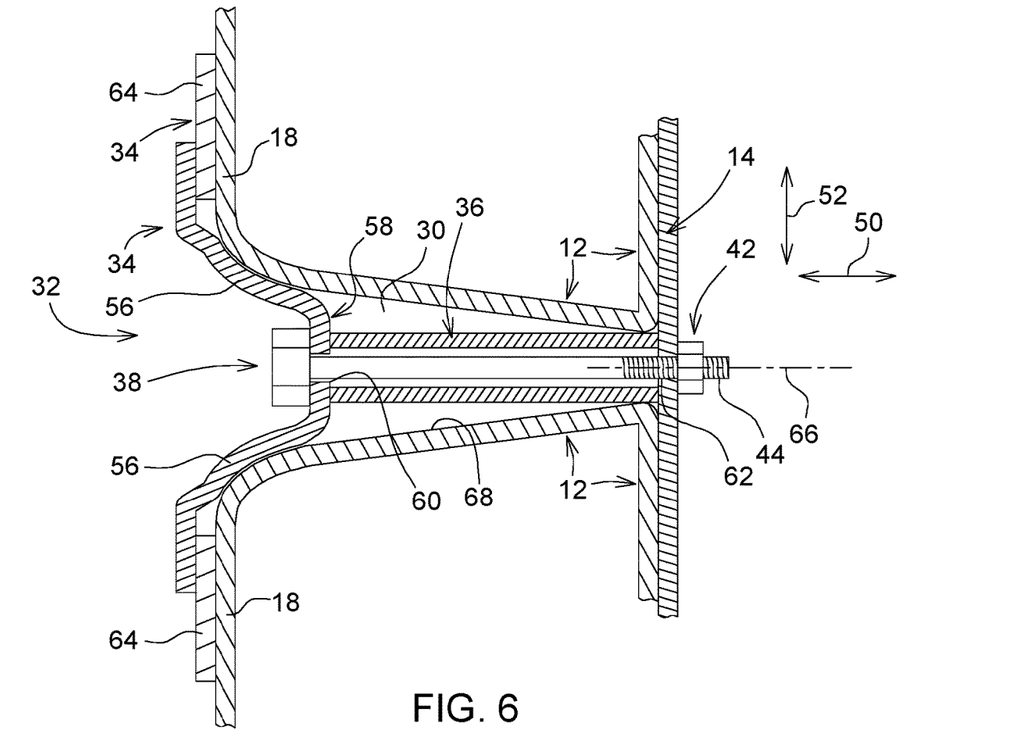
FIG. 6 is a sectional side view of the reinforcement in an installed position in an additional embodiment.

In particular, the transition component 56 is an integral component of the shield support 58, as shown in FIG. 6. According to FIG. 6, the annular disk-like reinforcement 64 is supported on the shield support 58 in the installation position, in that the shield support 58 or the transitional portion 56 clamps the reinforcement 64 axially between itself and the tank wall 18. Thereby the reinforcement 64 also contacts the tank wall 18. Depending on the application case, the internal or external diameter of the reinforcement 64 can have different dimensions with respect to the central longitudinal axis 66.

Figure 7:
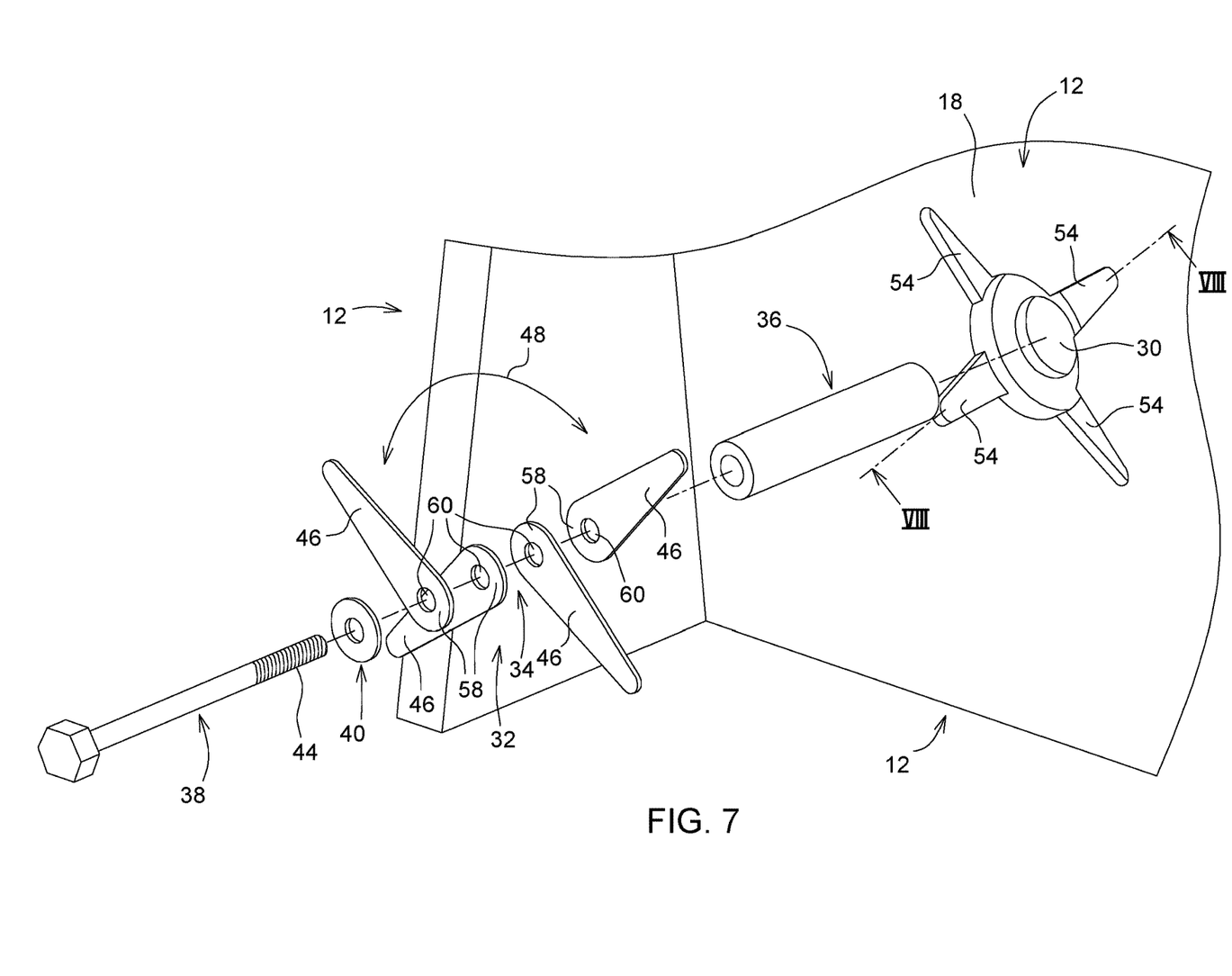
FIG. 7 is a perspective representation of the vehicle tank according to FIG. 3 and a reinforcement in an exploded view of an additional embodiment.
Figure 8:
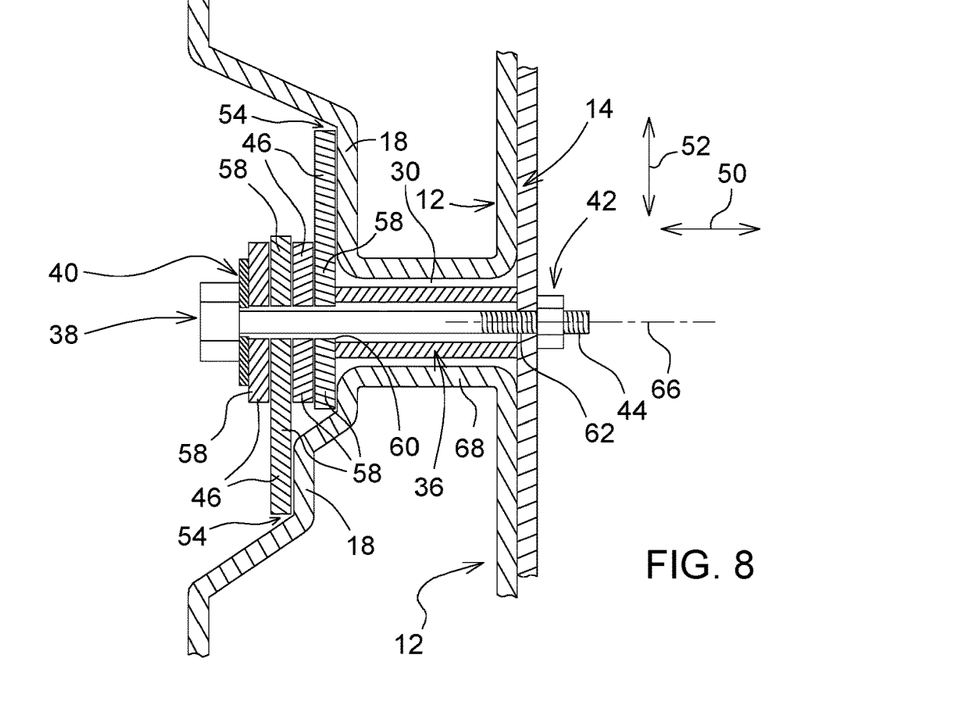
FIG. 8 is a sectional side view, corresponding to section line VIII-VIII in FIG. 7, of the reinforcement according to FIG. 7 in the installed position.

According to FIG. 7, the reinforcing shield 34 has four individual reinforcing braces 46, which are again uniformly distributed in the installation position along the circumferential direction 48, analogously to FIG. 3, and are each associated with a wall recess 54. In this variant, each reinforcing brace 46 is integrally connected to a shield support 58. Each shield support 58 is penetrated by a longitudinal support opening 60.

Figure 9:
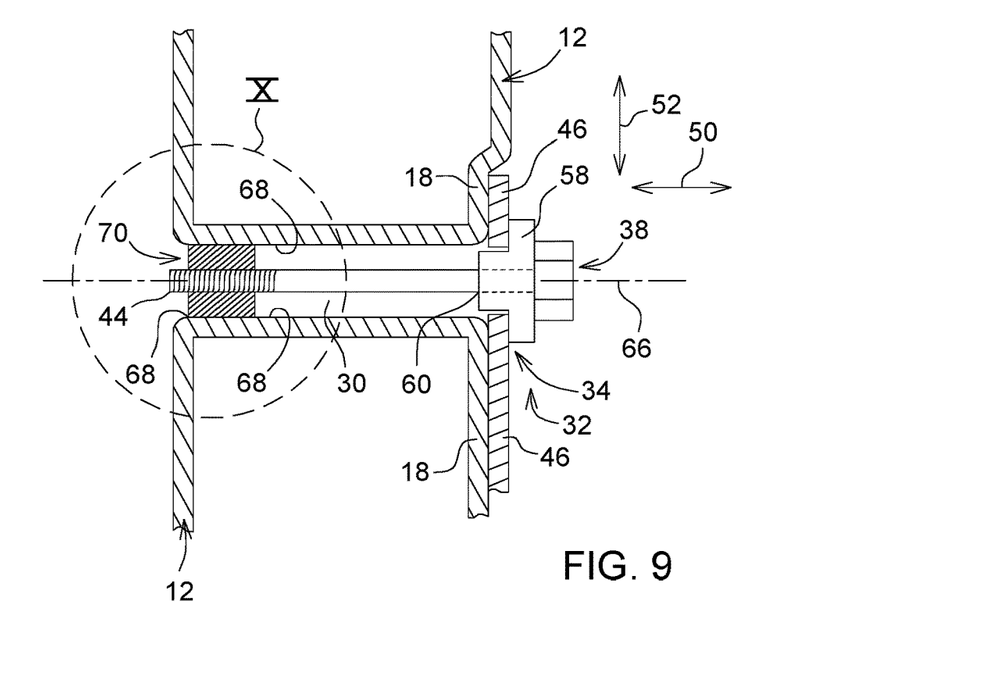
FIG. 9 is a sectional side view, corresponding to the section line IX-IX in FIG. 2, of the reinforcement in the installed position with a clamping device fixed on an outer wall of the vehicle tank.

FIG. 9 presents an embodiment of the reinforcing device 32 that, in contrast to the variants according to FIG. 4-6 and FIG. 8, is not fixed to the support structure 14 but rather to the vehicle tank 12 itself. This may be applicable for tank walls for which, due to their position relative to the supporting structure 14 of the vehicle 10, fixation of the reinforcing device on the support structure 14 is impossible or very cumbersome as is the case for the tank wall 22, for example (i.e., FIG. 2). In the installation position, the reinforcing device 32 according to FIG. 9 is therefore releasably connected to an outer wall 68 of the vehicle tank 12. This can be accomplished in various manners, as explained below. In all these variants, a reinforcing brace 46 is provided as the reinforcing shield 34 and interacts with a separate shield support 58 and is axially penetrated thereby.

The shield support 58 has a T-shaped cross-section and acts as an adapter for supporting different reinforcing braces 46 in that the external diameter of the shield support can have different dimensions in the radial direction 52 with a constant support opening 60, in order to be able to support correspondingly differently dimensioned reinforcing braces 46. Depending on the requirement, the reinforcing brace 46 can also deviate from a brace-like cross-sectional shape. The shield support 58 is fixed axially secured in the installation position of FIG. 9 by means of the screwed-in clamping bolt 38. At the same time, the reinforcing brace 46 is clamped axially between the shield support 58 and the tank wall 18 to be reinforced, so that the reinforcing shield 34 having the reinforcing brace 46 is mounted and fixed axially secured. The reinforcing brace 46 flanks the tank wall 18 to be reinforced by directly contacting it.

Figure 10:
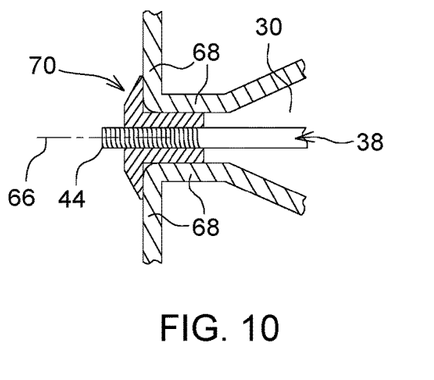
FIG. 10 is an enlarged view of another embodiment of the detail region X in FIG. 9.

To fix the reinforcing device 32 on the outer wall 68 of the vehicle tank 12 in position, the clamping bolt 38 interacts with suitable fixing means on the side of the passage opening 30 of the vehicle tank 12 facing away from the reinforcing shield 34. For example, a threaded insert 70 with an internal thread is provided which is cast into the passage opening 30 (FIG. 9) or pounded into the passage opening 30 in the manner of a mandrel or a dowel (FIG. 10).

Figure 11:
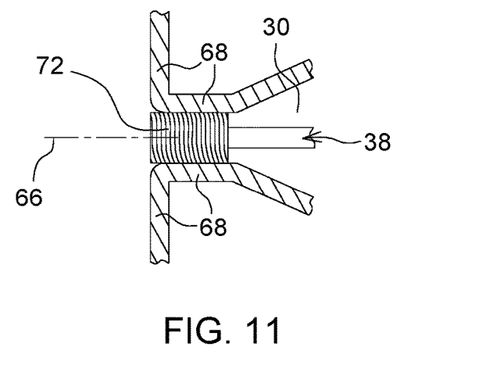
FIG. 11 is a schematic of another embodiment of the detail region X in FIG. 9.

In the embodiment according to FIG. 11, the outer wall 68 itself forms the fixing means cooperating with the clamping bolt 38. In this case, the clamping bolt 38 bears, at the illustrated axial end thereof, a self-tapping thread 72 that cuts into the outer wall 68.

Figure 12:
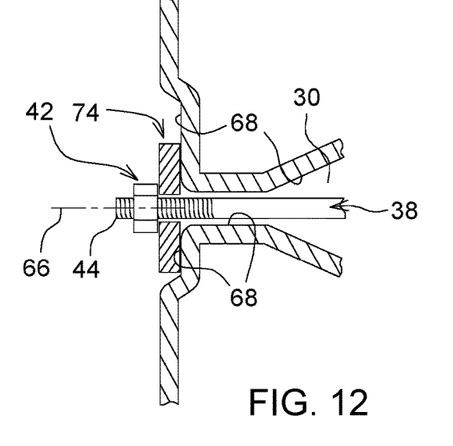
FIG. 12 is a further embodiment of the detail region X in FIG. 9.
Figure 13:
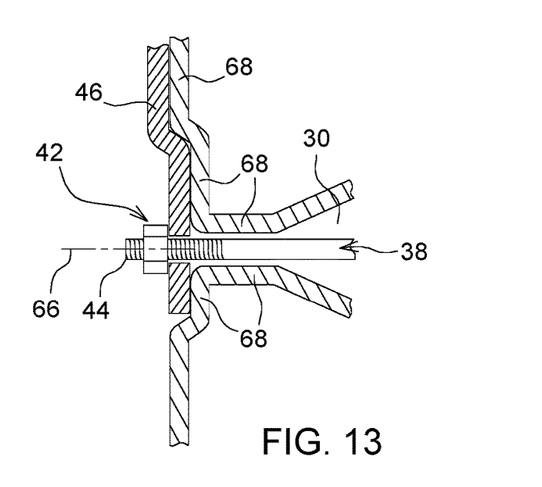
FIG. 13 is yet a further embodiment of the detail region X in FIG. 9.

In FIG. 12, the clamping bolt 38 and thus the reinforcing device 32 are fixed on the outer wall 68 by screwing the threaded nut 42 with an interposed annular washer 74 onto the external thread 44. In FIG. 13, the washer 74 is replaced by an additional reinforcing brace 46, which can provide a flanking and reinforcement of a portion of the outer wall 68 on the side of the passage opening opposite from the shield support 58 according to FIG. 9.

In the illustrated embodiments, releasing the threaded connection by means of the clamping bolt 38 also provides a release of the axial securing of the shield support 58 and the reinforcing shield 34 with respect to the vehicle tank 12.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A reinforcement for a tank wall of a vehicle tank, comprising:
   at least one reinforcing shield for flanking the tank wall;
   a shield support for supporting the reinforcing shield; and
   a clamping element;
   wherein, the shield support is axially secured in an axial direction on the clamping element, and at least a portion of the reinforcing shield extends in a flank direction transverse to the axial direction; and
   wherein the reinforcing shield comprises at least one reinforcing brace in a circumferential direction running transversely to the axial direction and transversely to the flank direction.

2. The reinforcement of claim 1, wherein the shield support is releasably secured in the axial direction.

3. The reinforcement of claim 1, wherein at least a portion of the reinforcing shield is arranged axially offset relative to the shield support.

4. The reinforcement of claim 1, wherein the reinforcing shield is fixedly connected by means of a transition section to the shield support.

5. The reinforcement of claim 1, wherein at least two reinforcing braces are arranged offset in the axial direction.

6. The reinforcement of claim 1, wherein the shield support comprises a support opening defined in the axial direction.

7. The reinforcement of claim 6, wherein the clamping element passes through the support opening of the shield support in the installation position of the reinforcing shield.

8. The reinforcement of claim 1, wherein the clamping element comprises a screw thread for axially secured fixation of the shield support.

9. The reinforcement of claim 1, wherein the reinforcing shield or the shield support comprises a metallic sheet.

10. An agricultural vehicle, comprising:
    a vehicle tank including at least one tank wall; and
    a reinforcement for the at least one tank wall of the vehicle tank, the reinforcement comprising at least one reinforcing shield for flanking the at least one tank wall and a shield support for supporting the reinforcing shield;
    wherein, the shield support is secured in an axial direction on a clamping element, and the at least one portion of the reinforcing shield extends in a flank direction transverse to the axial direction; and
    wherein the reinforcing shield comprises at least one reinforcing brace in a circumferential direction running transversely to the axial direction and transversely to the flank direction.

11. The vehicle of claim 10, wherein the vehicle tank comprises an axial passage opening defined by an outer wall thereof for receiving the clamping element.

12. The vehicle of claim 11, wherein the clamping element passes through the passage opening of the vehicle tank and is fixed on a support structure of the vehicle.

13. The vehicle of claim 11, wherein the clamping element passes through the passage opening of the vehicle tank and is fixed on the outer wall of the vehicle tank.

14. The vehicle of claim 12, wherein the clamping element interacts on a side of the passage opening of the vehicle tank facing away axially from the reinforcing shield, the clamping element comprising means for fixing the clamping element.

15. The vehicle of claim 10, wherein, wherein at least two reinforcing braces are arranged offset in the axial direction.

* * * * *